United States Patent

Kawase et al.

[11] Patent Number: 6,165,655
[45] Date of Patent: *Dec. 26, 2000

[54] TONER COMPOSITION AND USE THEREOF FOR FORMING SINTERED PATTERN ON SOLID SURFACE

[75] Inventors: Hiromitsu Kawase; Masaru Matsuda, both of Shizuoka-ken, Japan

[73] Assignee: Ricoh Company, Ltd., Tokyo, Japan

[*] Notice: This patent is subject to a terminal disclaimer.

[21] Appl. No.: 09/329,227

[22] Filed: Jun. 10, 1999

Related U.S. Application Data

[63] Continuation-in-part of application No. 08/985,737, Dec. 5, 1997, Pat. No. 5,976,736.

[30] Foreign Application Priority Data

| Dec. 5, 1996 | [JP] | Japan | 8-340608 |
| Dec. 30, 1996 | [JP] | Japan | 8-358629 |
| Dec. 30, 1996 | [JP] | Japan | 8-358630 |
| Dec. 2, 1997 | [JP] | Japan | 9-347270 |

[51] Int. Cl.[7] ............ G03G 9/09; G03G 13/22; G03C 3/00
[52] U.S. Cl. ............ 430/18; 430/106; 430/126
[58] Field of Search ............ 430/18, 106, 126

[56] References Cited

U.S. PATENT DOCUMENTS

| 3,565,654 | 2/1971 | Story | 106/243 |
| 5,422,216 | 6/1995 | Smith et al. | 430/106.6 |
| 5,750,299 | 5/1998 | Ohshima et al. | 430/47 |

FOREIGN PATENT DOCUMENTS

| 0751434 | 1/1997 | European Pat. Off. . |
| 0762223 | 3/1997 | European Pat. Off. . |
| 0774696 | 5/1997 | European Pat. Off. . |
| 0834784 | 4/1998 | European Pat. Off. . |
| 4413168 | 4/1995 | Germany . |

OTHER PUBLICATIONS

Patent Abstracts of Japan, vol. 096, No. 009, Sep. 30, 1996.
JP 08–119,068, May 1996.
Derwent Abstracts, AN 96–283,223. JP 08–119068, May 1996.

*Primary Examiner*—Roland Martin
*Attorney, Agent, or Firm*—Oblon, Spivak, McClelland, Maier & Neustadt, P.C.

[57] ABSTRACT

A toner composition useful for forming a single or full colored image on a transfer sheet, containing a coloring agent, and a binder resin, wherein the coloring agent contains a plural kinds of metal elements (a) which contribute to the color of the coloring agent and at least one kind of a metal element (b) which does not contribute to the color of the coloring agent. At least one of the metal elements (a) shows substantially the same two-dimensional distribution within an area of at least 1 square $\mu$m as that of the metal element (b) when analyzed by an electron prove micro analyzer. By sintering a ceramic, such as a tile, on which the image-bearing transfer sheet has been applied, a pattern corresponding to the toner image is formed on the ceramic.

14 Claims, No Drawings

TONER COMPOSITION AND USE THEREOF FOR FORMING SINTERED PATTERN ON SOLID SURFACE

CROSS REFERENCE TO RELATED APPLICATION

The present application is a continuation-in-part of copending U.S. application Ser. No. 08/985,737 filed Dec. 5, 1997, now U.S. Pat. No. 5,976,736, and entitled "TONER COMPOSITION AND USE THEREOF FOR FORMING SINTERED PATTERN ON SOLID SURFACE".

BACKGROUND OF THE INVENTION

This invention relates to a toner composition for developing an electrostatic latent image on a sheet. The present invention is also directed to use of the above toner image-bearing sheet for forming a sintered, mono-colored or full colored pattern on a solid surface such as a tile or a glazed porcelain.

Hitherto, a screen printing method has been utilized for the formation of similar patterns on a plurality of tiles or the like porcelain articles. JP-A-H8-119668 proposes a method in which electrophotography is utilized in place of the screen printing and discloses a toner containing a binder and a pigment for ceramic art. The toner is used for developing an electrostatic latent image formed on a transfer sheet. The toner image-bearing transfer sheet is then applied onto a surface of a ceramic body and heated to fix the pattern on the surface. JP-A-H8-119668 suggests to use the pigment in the form of a mixture with a vitreous such as boro-silicated glass. Such a mixture is produced by blending one or more metal oxide pigments with a vitreous, the blend being subsequently fused at 900° C. and, thereafter, cooled and ground.

The toner proposed in JP-A-H8-119668, however, has a problem because a pattern having a high image density is not obtainable and because the color of the image is not uniform.

SUMMARY OF THE INVENTION

It is, therefore, an object of the present invention to provide a metal oxide pigment-containing toner useful for forming a pattern on a solid surface, such as ceramics, and having a satisfactory color density even when the amount of the pigment is small, Another object of the present invention is to provide a toner having a high developing efficiency so that an electrostatic latent image on a transfer sheet can be effectively developed to give a high density toner image.

It is a further object of the present invention to provide a toner of the above-mentioned type with which a clear mono-colored or full colored pattern can be formed with good responsibility on a solid surface such as ceramics.

In accomplishing the foregoing object, there is provided in accordance with the present invention a toner composition, which comprises a coloring agent, and a binder resin, the coloring agent including a plural kinds of metal elements (a) which contribute to the color of the coloring agent and at least one kind of a metal element (b) which does not contribute to the color of the coloring agent.

Preferably, at least one of the metal elements (a) shows substantially the same two-dimensional distribution within an area of at least 1 square μm as that of at least one of the metal element (b) when analyzed by an electron prove micro analyzer.

In another aspect, the present invention provides an image forming method, which comprises subjecting a transfer sheet to electrophotography using the above toner composition to form an image of the toner on the transfer sheet.

The present invention also provides a sheet material which comprises a transfer sheet having an image formed of the above toner composition.

The present invention further provides a method of forming a pattern on a heat-resisting solid surface, which comprises applying the above-described image-bearing sheet on the surface, and sintering the applied surface.

The present invention further provides a sintered article obtained by the above pattern forming method.

Other objects, features and advantages of the present invention will become apparent from the detailed description of the preferred embodiments of the invention to follow.

DETAILED DESCRIPTION OF THE PREFERRED EMBODIMENTS OF THE INVENTION

The toner according to the present invention includes a binder resin and a coloring agent. The coloring agent includes a plural kinds of metal elements (a) which contribute to the color of the coloring agent, and at least one kind of a metal element (b) which does not contribute to the color of the coloring agent.

The coloring agent may be produced as follows. A plurality of metal oxides are first mixed, fused, cooled and ground to obtain a compound oxide pigment. The compound oxide pigment is then mixed with a flux and the mixture is fused, cooled and ground to form the coloring agent. The coloring agent is thus a unitary body containing the compound oxide pigment and the flux.

Generally, the plural kinds of metal elements (a) which contribute to the color of the coloring agent are metal elements constituting the plurality of metal oxides used for the preparation of the compound metal oxide pigment. The metal oxides include known inorganic pigments and metal oxides used for the fabrication of inorganic pigments. Thus, in the present invention, when a metal element constituting such a metal oxide is present in the coloring agent, the metal element may be generally regarded as being one of the metal elements (a) which contribute to the color of the coloring agent.

The metal element (b) which does not contribute to the color of the coloring agent is generally a metal element or elements constituting the flux to be mixed and fused with the compound oxide pigment for the preparation of the coloring agent. The flux may be a glass generally used in ceramic industry for improving bonding of an inorganic pigment on a refractory solid. Any metal element constituting such a glass can be the metal element (b) which does not contribute to the color of the coloring agent. Thus, in the present invention, when a metal element constituting such a glass is present in the coloring agent, the metal element may be generally regarded as being the metal element (b) which does not contribute to the color of the coloring agent.

The compound oxide pigment is not a mere mixture of a plurality of metal oxides but, rather, a metal oxide containing a plural kinds of metals which interact with each other. A compound oxide pigment consisting of two kinds of metal elements is known as a double oxide. Whether or not a metal oxide pigment containing a plural kinds of metal elements is a compound oxide pigment can be determined by the analysis with an electron probe micro analyzer (EPMA). When the metal elements of the pigment have substantially the same two-dimensional distribution, then the pigment is regarded as being a compound oxide pigment.

The compound oxide pigment may be obtained by heating a blend of a plurality of metal compounds at a temperature of 1,000–1,300° C. to form a metal oxide pigment having a desired color. The metal oxide pigment is then cooled, solidified and ground to obtain a compound oxide pigment. The compound oxide pigment, which is obtained by heating a blend of a plurality of metal compounds at a temperature of 1,000–1,300° C., is not a mere mixture of metal oxides of respective metal compounds but is considered to be a novel substance. The compound oxide pigment preferably has a volume average particle diameter of not more than 100 µm as measured by a method using a particle size measuring device of a laser scattering type in which the sample to be measured is sonicated in a surfactant-containing water.

One of the features of the present invention resides in that the flux is heated, fused, then cooled and ground before being mixed with the compound metal oxide pigment. By this expedience, discoloration of the compound metal oxide pigment during sintering with the flux is prevented. In the toner proposed in JP-H-R8-119668, on the other hand, a flux and a metal oxide pigment without having been previously heat-treated are mixed and fused. The known toner thus causes discoloration during the mixing and fusing, so that the effect of the present invention cannot be attained.

Incidentally, the coloring agent according to the present invention may be utilized not only in the field of electrophotography but also in various printing methods such as screen printing, ink jet printing and solid jet printing.

The coloring agent including the compound oxide pigment has been found to give a higher color density than a colorant of a mere mixture of the corresponding metal compounds. Namely, desirable color concentration can be obtained even with a small amount of the pigment. It is desirable that satisfactory color density be obtained with an amount of the pigment of $9.45 \times 10^{-4}$ g/cm$^2$ or less in the case of yellow pigment, $9.45 \times 10^{-4}$ g/cm$^2$ or less in the case of magenta pigment, $7.35 \times 10^{-4}$ g/cm$^2$ or less in the case of cyan pigment and $7.35 \times 10-4$ g/cm$^2$ or less in the case of black pigment. Although not wishing to be bound by the theory, it is inferred that such an increase of the color density is attributed to the splitting of the d-orbital of a metal element. Namely, the d-orbital of the metal element which is degenerated when present as a simple mixture with other kinds of metal elements is split when the metal element is fused together with the other kinds of metal elements to form a structure like an alloy. Thus, the number of the electron transition orbital is increased, so that the apparent oscillator strength is increased.

Examples of suitable metals or metal oxides for use in preparation of compound oxide pigments are as follows:
(1) yellow compound oxide pigment: antimony pentaoxide ($Sb_2O_5$), ferric oxide ($Fe_2O_3$), minium ($Pb_3O_4$);
(2) cyan compound oxide pigment: cobalt oxide (CoO), zinc white (ZnO), chromium oxide ($Cr_2O_3$);
(3) black compound oxide pigment: cobalt oxide (CoO), manganese oxide ($MnO_2$), chromium oxide ($Cr_2O_3$), ferric oxide ($Fe_2O_3$);
(4) magenta compound oxide pigment: gold (Au), ferrous oxide (FeO), tin oxide (SnO). The metal elements of the metal or metal oxides exemplified above are examples of metal elements (a) which contribute to the color of the coloring agent.

The compound oxide pigment is composited with a flux to form the coloring agent having high transferability. Especially when the pigment is covered with the flux, the transferability of the toner is improved, probably because leakage of transferring charges is prevented by the flux.

It is preferred that the flux have an electric resistivity greater than that of the compound oxide pigment, Generally, the electric resistivity of the flux is $10^6$–$10^{16}$ Ω·cm, while that of the pigment is $10^5$–$10^8$ Ω·cm. The resistivity herein is measured with a cylinder type electrode device (High Resistance Meter 4329 of YHP). A sample (about 6–10 g) is placed in the device and a resistivity of the sample is measured while applying a load of 3–5 kg thereto. Measurement is repeated 3–5 times and an average of volume specific resistance is calculated.

The flux serves to bind the toner image on a solid surface to be colored such as a ceramic surface when sintered. A glaze material customarily used in the field of the ceramic art may suitably used as the flux.

As the flux, there may be mentioned various substances used as glass components. Illustrative of flux are an alkali metal or alkaline earth metal hydroxide such as lithium hydroxide; an alkali metal or alkaline earth metal carbonate such as lithium carbonate; an alkali metal or alkaline earth metal chloride; aluminum chloride; boric acid; an alkali metal or alkaline earth metal salt of boric acid; an alkali metal or alkaline earth metal salt of metaboric acid; an alkali metal or alkaline earth metal salt of phosphoric acid; an alkali metal or alkaline earth metal salt of pyrophosphoric acid; an alkali metal or alkaline earth metal salt of silicic acid; an alkali metal or alkaline earth metal salt of metasilicic acid; zirconium silicate; bone ash; borax; ammonium metavanadate; a metal oxide such as tungsten oxide, vanadium pentaoxide, tin oxide, zirconium oxide, cerium oxide or molybdenum oxide or lead oxide; a metal fluoride such as calcium fluoride or aluminum fluoride; glass; or a mixture of two or more thereof. Above all, the use of a lead compound is preferred for reasons of improved adhesiveness and film forming property and of capability of providing a toner giving clear images.

In addition, a feldspar, e.g. potassium feldspar, sodium feldspar or lithium feldspar; a natural mineral, e.g. kaolin, alumina, silica rock, quartz, titania, silica, chamotte, limestone, lead oxide, talc, magnesite, dolomite, soil ash; barium carbonate, zinc oxide, strontium carbonate; or a mixture of two or more thereof may also be used as the flux.

Preferably, a mixture of two or more of the above flux materials is heat treated at a temperature of 1,000–1,300° C. before being mixed and fused with the compound oxide pigment.

Metal element or elements constituting the above flux represent one or more metal elements (b) which do not contribute to the color of the coloring agent.

It is also preferred that the flux be transparent upon being sintered for reasons of clearness of images. It is further preferred that the flux have the same color tone with that of the pigment upon being sintered. The term "same color tone" used herein is intended to refer to, for example, the relationship between red and pink, between egg yellow and lemon yellow or between dark blue and sky blue. In such a case, the flux does not adversely affect the color tone of the pigment when the toner image is fixed.

The flux and the compound oxide pigment are composited by sintering a mixture of the pigment with the flux at a temperature of, preferably, 750–80 °C., and then grinding the sintered mixture to obtain the finely divided coloring agent. In this case, it is preferred that the flux be heat treated at a temperature of 1,000–1,300° C. before being mixed with the pigment for reasons of the prevention of discoloration of the compound metal oxide pigment during sintering. The weight ratio of the compound oxide pigment to the flux is preferably 0.1 to 3. A weight ratio of the compound oxide pigment to the flux below 0.1 tends to cause insufficient color density, whereas too large a weight ratio in excess of 3 tends to cause insufficient adhesion of the toner image on a solid surface. The coloring agent preferably has an average diameter of 1–$\mu$m.

Since the temperature at which the compound oxide pigment and the flux are sintered together to form the coloring agent is lower than the temperature at which metal oxides are sintered to form the compound oxide pigment, the compound oxide pigment and the flux in the coloring agent are considered to retain, at least a part, their original structure. EPMA analysis of the coloring agent, however, has revealed that the metal elements constituting the compound oxide pigment show substantially the same two-dimensional distribution within an area of at least 1 square $\mu$m as that of the metal elements constituting the flux. This suggests that at least part of the compound oxide pigment and the flux forms a unitary structure, like an alloy, in which the metal elements of the compound oxide pigment and the flux are amalgamated in an atomic level.

Thus, in the preferred coloring agent according to the toner composition of the present invention, at least one of the metal elements (a) which contribute to the color of the coloring agent (e.g. compound oxide pigment) shows substantially the same two-dimensional distribution within an area of at least 1 square $\mu$m as that of at least one of the metal element (b) which does not contribute to the color of the coloring agent (e.g. flux) when analyzed by EPMA.

EPMA is an analyzer capable of measuring two-dimensional distribution (mapping) of elements such as Group 1 elements (e.g. Cu, Ag and Au), Group 2 elements (e.g. Cd), Group 4 elements (e.g. Ti), Group elements (e.g. V and Sb), Group 6 elements (e.g. Se, Cr, Mo, W and U), Group 7 elements (e.g. Mn) and Group 8 elements (Fe, Co, Ni, Ir, Pt) by scanning an electron beam on a sample. The kind of the element is determined by wavelength and the content of the element is determined by intensity. More particularly, a high speed electron beam is condensed with a condensing lens to a beam diameter of about 1 $\mu$m. A sample is irradiated with the condensed beam, so that characteristic X-rays are generated. The X-rays are analyzed with an X-ray spectrometer such as EPMA-8705 (manufactured by Shimadzu Manufacturing Co., Ltd.) and a photograph is taken with SEM (magnification: 2000). Color mapping is carried out for respective elements in accordance with the SEM image. Mapping treatment is to two-dimensionally dispersing the state of the element. More particularly, distribution of each of elements is indicated as a color pattern using a computer. The density of the color corresponds to the content of the element concerned. The color patterns of respective elements are compared with each other. When the pattern of a first element is substantially the same as the pattern of a second element, then the first element is regarded as showing substantially the same two-dimensional distribution within an area of at least 1 square $\mu$m as that of the second element.

The coloring agent is used for the preparation of toner for use in electrophotography as a mixture thereof with a binder resin and any other suitable known additives or, if desired, may be utilized as such for screen printing, ink jet printing and solid jet printing. When utilized as a toner, the finely divided coloring agent containing the above flux and pigment is mixed in any known manner with a binder. For example, a blend of the coloring agent and the binder is kneaded at a temperature higher than melting point of the binder. The kneaded mixture is then solidified and ground into particles to obtain a toner according to the present invention. The toner preferably has an average particle diameter of 5–$\mu$m. The amount of the coloring agent in the toner is preferably 5–60% by weight.

The binder may be any thermoplastic resin conventionally used in the field of toner for electrophotography, such as a polyester resin, a polystyrene resin, a polyethylene resin, a polyamide resin, an epoxy resin, an epoxypolol resin, a terpene resin or a mixture thereof. Illustrative of suitable thermoplastic resins are polystyrene, styrene-methyl acrylate copolymers, styrene-ethyl acrylate copolymers and styrene-acrylic acid-n-butyl acrylate copolymers.

The toner preferably contains a customarily employed charge controlling agent. Illustrative of suitable positively charging agents are nigrosine dyes, quaternary ammonium salts, Cr-containing dyes, Zn-containing dyes, Fe-containing dyes, chelate dyes of molybdic acid and fluorine-modified quaternary ammonium salts. The amount of the charge controlling agent is generally 0.1–10 parts by weight, preferably 2–6 parts by weight, per 100 parts by weight of the binder resin.

The toner according to the present invention may further contain one or more additives, if desired. Illustrative of additives are zinc stearate, hydrophobic silica, aluminum stearate and titanium oxide.

The toner of the present invention may be used as a single-component-type developing system in which the toner is used by itself for developing an electrostatic latent image or as a two-component-type developing system in which the toner is used in conjunction with carrier particles for developing an electrostatic latent image. The carrier may be (a) magnetic particles such as of metals, compounds and alloys of iron, cobalt and nickel, (b) glass beads or (c) composite particles composed of the above magnetic particles or glass beads each coated with a layer of a resin. Illustrative of suitable resin for forming the resin coating are polycarbon fluoride, polyvinyl chloride, polyvinylidene chloride, phenol resin, polyvinyl acetal and silicone resin. In the two-component-type system, the toner is used in an amount of 1–20 parts by weight, preferably 8–12 parts by weight, per 100 parts by weight of the carrier.

The toner according to the present invention is used for forming a desired mono-color or full color pattern on a heat-resisting solid surface. The pattern can be formed by directly developing a toner image on the solid surface, the developed toner image being subsequently heated to fix the image on the solid surface. Alternatively, the pattern can be formed by a method including developing a toner image on a transfer sheet, then applying the image-bearing sheet on the solid surface, and heating the sheet to fix the image on the solid surface. Since the former, direct method requires a specific machine for developing the toner image, the latter, indirect method is preferably adopted.

In the indirect method, a commercially available mono-color or full color copying machine can be used for developing a desired toner image on a transfer sheet. The transfer sheet may be constituted of a substrate, such as a paper, a resin film or a glass film, having coated thereover an adhesive layer such as a water-soluble adhesive, e.g. dextrin or polyvinyl alcohol. The toner image is formed on the adhesive layer. Commercially available transfer sheets of a screen printing type used in the field of ceramic art may be used as such for the purpose of the present invention.

The image-bearing surface of the transfer sheet is preferably applied with a solution or dispersion containing a water-insoluble thermoplastic resin, glass powder or flux powder, since the pattern after calcination has improved clearness. The transfer sheet is then immersed in water and separated into the substrate and the surface layer having the toner image The image-bearing surface layer thus separated from the substrate is applied to an article having a heat-resisting surface, such as a tile, a glazed ceramic (e.g. a ceramic glass, a porcelain or a china), a heat-resisting glass, a metal or a porcelain enamel-coated metal.

It is preferred that the heat-resisting solid surface have a high whiteness for reasons of availability of a clear colored pattern. Preferably, the whiteness of the solid surface is such that the reflectance of a light having a wave length in the range of 450–800 nm is at least 93%, more preferably at least 96%. Further, it is preferred that the solid surface be low in surface roughness, i.e. the 10 points average surface roughness Rz in accordance with Japan TAPPI Paper Pulp Test Method No. 5–74 is preferably 5 $\mu$m or less, more preferably 1 $\mu$m or less.

It is also preferred that the solid surface be coated with a fusible inorganic substance, such as a glass, glaze or flux, for reasons of improved adhesion of the toner pattern on the solid surface. Such a coating preferably has a thickness of 1–20 $\mu$m, more preferably 3–10 $\mu$m. Alternatively, the fusible inorganic substance may be incorporated into the solid surface, if desired.

The solid surface on which the image-bearing surface layer is applied is then sintered at 800–850° C., for 1–10 hours in any known oven or kiln, such as an electric oven, a microwave oven or a dielectric oven, to obtain a final product having the mono-color or full color pattern. If necessary, the sintering is carried out while controlling the oxidation and reduction conditions.

The following examples will further illustrate the present invention. Parts are by weight.

Preparation of Flux

A blend of metal oxides composed of 80 parts of $Al_2O_3$, 370 parts of $SiO_2$, 50 parts of $Na_2O$ and 500 parts of PbO (hereinafter such a blend will be simply expressed as $Al_2O_3$/$SiO_2$/$Na_2O$/PbO of 80/370/50/500) was ground with a stamp mill and then mixed with a Henschel mixer. The mixture was then heat-treated at 1,200° C. to obtain a flux (hereinafter referred to as Flux A). A sample (g) of Flux A was placed in a cylindrical electrode chamber of High Resistance Meter 4329 (manufactured by YHP Inc.) and measured for the volume resistivity under a load of 5 g. The measurement was carried out for five samples and the resistivity value were averaged. Flux A was found to have a resistivity of $1.69 \times 10^9$ $\Omega$·cm.

Preparation of Coloring Agents (A) Black Compound Oxide Pigment

A blend of metal oxides $Cr_2O_3$/MnO/$Fe_2O_3$/CoO of 110/270/112/508 was ground with a stamp mill and then mixed with a Henschel mixer. The mixture was then heat-treated at 1,100° C. to obtain a compound oxide pigment (hereinafter referred to as Pigment A).

Pigment A (300 parts) was then mixed with 500 parts of Flux A with a Henschel mixer and the mixture was calcined at 750° C. and ground to obtain a coloring agent (hereinafter referred to as Coloring Agent A).

(B) Yellow Compound Oxide Pigment

A blend of metal oxides $Fe_2O_3$/$Sb_2O_5$/$Pb_3O_4$ of 10/190/800 was ground with a stamp mill and then mixed with a Henschel mixer. The mixture was then heat-treated at 1,100° C. to obtain a compound oxide pigment (hereinafter referred to as Pigment B).

Pigment B (300 parts) was then mixed with 500 parts of Flux A with a Henschel mixer and the mixture was calcined at 750° C. and ground to obtain a coloring agent (hereinafter referred to as Coloring Agent B).

(C) Magenta Compound Oxide Pigment

A blend of metal oxides $Fe_2O_3$/NiO/CuO/$Au_2O$ of 160/40/40/760 was ground with a stamp mill and then mixed with a Henschel mixer. The mixture was then heat-treated at 1,100° C. to obtain a compound oxide pigment (hereinafter referred to as Pigment C).

Pigment C (300 parts) was then mixed with 500 parts of Flux A with a Henschel mixer and the mixture was calcined at 750° C. and ground to obtain a coloring agent (hereinafter referred to as Coloring Agent C).

(D) Cyan Compound Oxide Pigment

A blend of metal oxides $Cr_2O_3$/$Fe_2O_3$/$Co_2O_3$/ZnO of 170/10/690/130 was ground with a stamp mill and then mixed with a Henschel mixer. The mixture was then heat-treated at 1,100° C. to obtain a compound oxide pigment (hereinafter referred to as Pigment D).

Pigment D (300 parts) was then mixed with 500 parts of Flux A with a Henschel mixer and the mixture was calcined at 750° C. and ground to obtain a coloring agent (hereinafter referred to as Coloring Agent D).

(E) Black Oxide Pigment E

A blend of metal oxides $Cr_2O_3$/MnO/$Fe_2O_3$/CoO of 110/270/112/508 was ground with a stamp mill and then mixed with a Henschel mixer to obtain an oxide pigment (hereinafter referred to as Pigment E).

Pigment E (300 parts) was then mixed with 500 parts of Flux A with a Henschel mixer and the mixture was calcined at 900° C. and ground to obtain a coloring agent (hereinafter referred to as Coloring Agent E).

(F) Black Oxide Pigment F $Cr_2O_3$ (300 parts) was mixed with 500 parts of Flux A with a Henschel mixer and the mixture was calcined at 900° C. and ground to obtain a first mixture. MnO (300 parts) was mixed with 500 parts of Flux A with a Henschel mixer and the mixture was calcined at 900° C. and ground to obtain a second mixture. $Fe_2O_3$ (300 parts) was mixed with 500 parts of Flux A with a Henschel mixer and the mixture was calcined at 900° C. and ground to obtain a third mixture. CoO (300 parts) was mixed with 500 parts of Flux A with a Henschel mixer and the mixture was calcined at 900° C. and ground to obtain a fourth mixture. The first to fourth mixtures were then mixed to obtain a coloring agent F having a weight ratio of $Cr_2O_3$/MnO/$Fe_2O_3$/CoO of 110/270/112/508.

Physical Properties of Pigments A–F and Coloring Agents A–F

Pigments A–F were each measured for volume resistivity and found to range from $1.56 \times 10^6$ $\Omega$·cm to $5.89 \times 10^8$ $\Omega$·cm. Electron microscopic analysis (SEM, magnification: 2,000) of Coloring Agents A–F revealed that Pigments A–F were covered with Flux A.

Coloring Agents A–F were analyzed with an electron probe X-ray micro analyzer (EPMA-8705 manufactured by Shimadzu Seisakusho Co., Ltd.) according to the following method:

A sample is irradiated with an electron beam (beam diameter: 1 $\mu$m) and the characteristic X-rays generated are spectrometrically analyzed for respective elements constituting the coloring agent. Color mapping is carried out for respective elements in accordance with the SEM image (magnification: 2000). The area of the pattern on the color mapping of each of the elements is measured. The area (S1, S2, . . . Sn) of the pattern of each of the elements constituting the pigment is compared with the area (S) of a selected one of the elements (for example Pb) of the flux. When each of the areas S1 through Sn is within the range of 0.9S to 1.1S, then the distribution of the elements constituting the pigment is regarded as being the same. Further, when at least one of the areas S1 through Sn is within the range of 0.9S to 1.S, then the two-dimensional distribution within an area of at least 1 square μm of the elements constituting the pigment is regarded as being substantially the same as that of the metal element constituting the flux.

The results showed that Pigments A–D formed compound oxide pigments. Further, the metal elements constituting each of Pigments A–D showed substantially the same two-dimensional distribution within an area of at least 1 square μm as that of the metal element constituting the flux of Coloring Agents A–D. The distribution of the elements constituting the pigments of each Coloring Agents E and F was evaluated as being not the same.

| Preparation of Carrier: | |
|---|---|
| Silicone resin (KR50 manufactured by Shinetsu Kagaku Inc.) | 100 parts |
| Carbon black (BP 2000 manufactured by Cabott Inc.) | 3 parts |
| Toluene | 100 parts |

The above composition was mixed with a mixer for 30 minutes to form a dispersion. The dispersion was charged into a fluidized bed-type coating device together with 1,000 parts of ferrite particles having an average particle diameter of 100 μm. The ferrite particles thus coated were dried to obtain Carrier A.

Preparation of Toner and Developer

230 Parts of each of Coloring Agents A–F, 100 parts of an epoxy resin (Tg: 60° C.) and 4 parts of zinc salicylate (Bontron $84 manufactured by Orient Chemical Inc.) were mixed with each other using a mixer and the mixture was kneaded with a two-roll kneader. The kneaded mixture was then rolled, solidified, ground and sieved to obtain a toner (Toner A through Toner F) having the volume average particle diameter shown in Table 1 above. Each of Toner A through Toner F was mixed with 0.5% by weight of hydrophobic silica (R972 manufactured by Japan Aerosil Inc.) using a mixer. The resulting mixture (90 parts) was further mixed with 910 parts of Carrier A using a ball mill for 30 minutes to obtain Developer A through Developer F.

TABLE 1

| Developer | Toner | Average Particle Diameter of Toner (μm) |
|---|---|---|
| Developer A | Toner A | 9.3 |
| Developer B | Toner B | 9.5 |
| Developer C | Toner C | 9.7 |
| Developer D | Toner D | 9.3 |
| Developer E | Toner E | 9.1 |
| Developer F | Toner F | 9.0 |

Formation of Pattern on Tile

A copy image was formed on a commercially available transfer sheet (OK Series sheet for stencil printing in the ceramic art; manufactured by Nitto Shiko Inc.; a laminate composed of a surface layer, an adhesive layer and a substrate) using each of Developers A through F charged in a copying machine (Imagio 530 manufactured by Ricoh Company, Ltd.) under the following conditions.

Process speed: 120 m/sec
Charging voltage: −650V
Exposure voltage: −100V
Development gap: 0.6 mm
Doctor gap: 0.45 mm
Linear speed ratio: 1.5 (relative to the photoconductor)
Development bias: AC(p−p1KV)+DC(−500V)
Belt transfer bias: 1400V
Paper transfer bias: 1300V The toner image-bearing surface of the transfer sheet was applied with a polystyrene resin coating and then immersed in water to remove the substrate. The surface layer was applied on a tile (RS252/1001 manufactured by INAX Inc.) and the assembly was sintered at 800° C. for 5 hours to obtain a desired tile having a pattern corresponding to the toner image. The image density of the pattern on the tile formed using each of Developers A–F is shown in Table 2.

TABLE 2

| Developer | Image Density |
|---|---|
| A | 1.57 |
| B | 1.12 |
| C | 1.09 |
| D | 1.07 |
| E* | 0.82 |
| F* | 0.52 |

*: Comparative Example

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A toner composition for developing electrostatic images, comprising a coloring agent, and a binder resin, said coloring agent comprising (a) a plurality of metal elements which contribute to the color of said coloring agent, and (b) at least one metal element which does not contribute to the color of said coloring agent.

2. A composition as claimed in claim 1, wherein at least one of metal elements (a) shows substantially the same two-dimensional distribution within an area of at least 1 square μm as that of at least one metal element (b) when analyzed by an electron probe micro analyzer.

3. A composition as claimed in claim 1, wherein all metal elements (a) and (b) show substantially the same two-dimensional distribution within an area of at least 1 square μm when analyzed by an electron probe micro analyzer.

4. A composition as claimed in claim 1, wherein said coloring agent comprises a compound metal oxide pigment containing said plurality of metal elements (a), and a flux containing said metal element (b).

5. A composition as claimed in claim 1, wherein all metal elements (a) show substantially the same two-dimensional distribution within an area of at least 1 square μm when analyzed by an electron probe micro analyzer.

6. A composition as claimed in claim 1, wherein said plurality of metal elements (a) constitute a plurality of different metal oxides.

7. A composition as claimed in claim 1, wherein said plurality of metal elements (a) are selected from the group consisting of (1) Sb, Fe and Pb, (2) Co, Zn, Al and Cr, (3) Co, Mn, Cr and Fe, or (4) Au, Fe and Sn.

8. A composition as claimed in claim 1, which is yellow, magenta, cyan or black.

9. An image forming method, comprising subjecting a transfer sheet to electrophotography using a toner composition according to claim 1 to form an image of said toner on said transfer sheet.

10. A method as claimed in claim 9, further comprising covering said image with a layer of a material selected from the group consisting of thermoplastic resins, glass and vitrifiable substances.

11. A sheet material comprising a transfer sheet having an image formed of a toner composition according to claim 1.

12. A sheet material as claimed in claim 11, further comprising a layer covering said image and formed of a material selected from the group consisting of thermoplastic resins, glass and vitrifiable substances.

13. A method of forming a pattern on a heat-resisting solid surface, comprising applying an image-bearing sheet according to claim 11 on said surface, and sintering said applied surface.

14. An article obtained according to claim 13.

* * * * *

UNITED STATES PATENT AND TRADEMARK OFFICE
CERTIFICATE OF CORRECTION

PATENT NO. : 6,165,655

DATED : December 26, 2000

INVENTOR(S): Hiromitsu KAWASE, et al.

It is certified that an error appears in the above-identified patent and that said Letters Patent is hereby corrected as shown below:

On the title page, item [30], theForeign Application Priority Data is incorrectly listed. Item [30] should read as follows:

--[30]   Foreign Application Priority Data

Dec. 5, 1996   [JP]   Japan.................................8-340608
    Dec. 30, 1996  [JP]   Japan.................................8-358629
    Dec. 30, 1996  [JP]   Japan.................................8-358630--

Signed and Sealed this

Eighth Day of May, 2001

NICHOLAS P. GODICI

*Attest:*

*Attesting Officer*    *Acting Director of the United States Patent and Trademark Office*